May 14, 1940.  F. W. JACOBS  2,200,422
VEHICLE POSITION ALTERING DEVICE
Filed Oct. 28, 1939   2 Sheets-Sheet 1
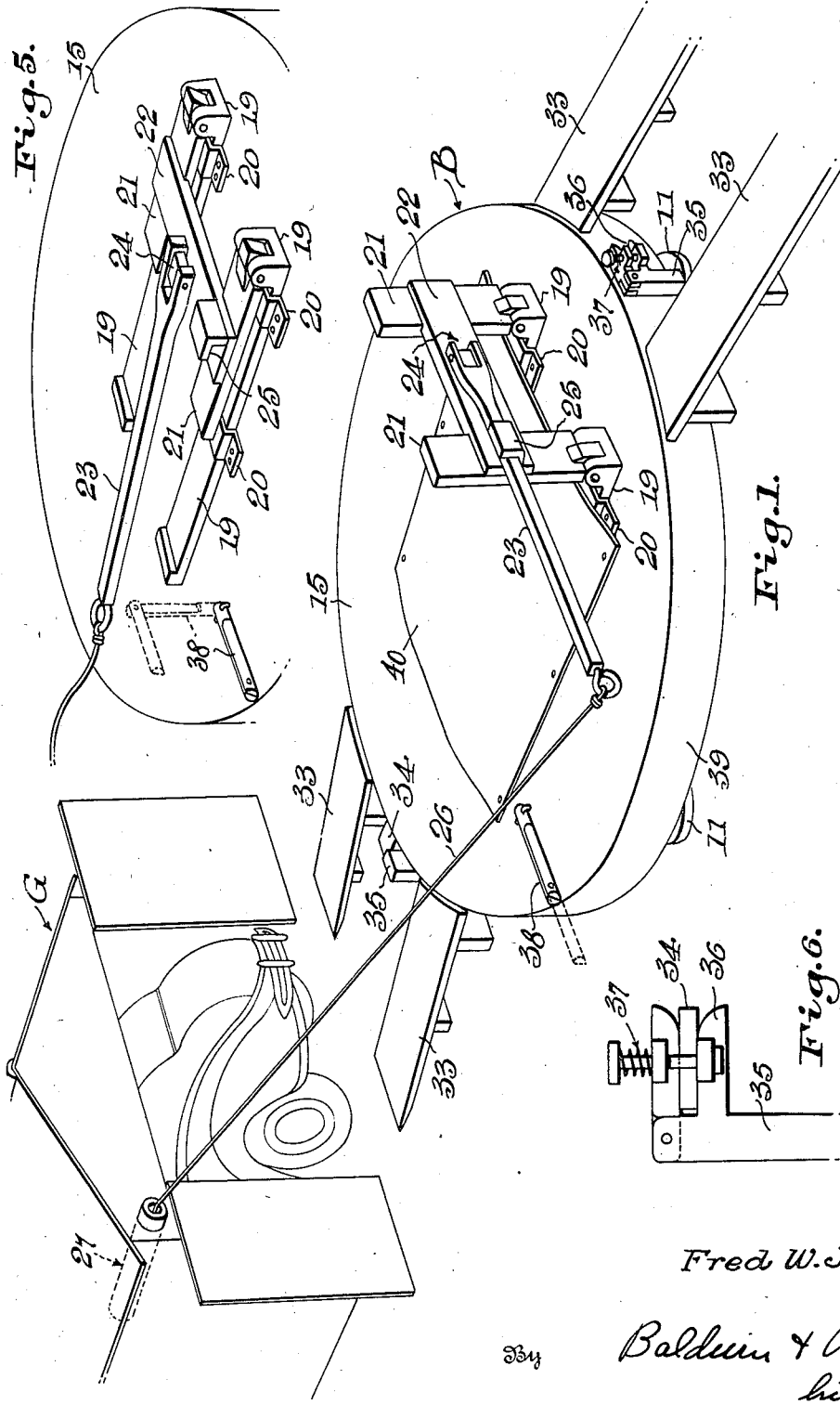
Inventor
Fred W. Jacobs
By Baldwin & Wight
his Attorneys May 14, 1940.　　　　F. W. JACOBS　　　　2,200,422
VEHICLE POSITION ALTERING DEVICE
Filed Oct. 28, 1939　　　2 Sheets-Sheet 2
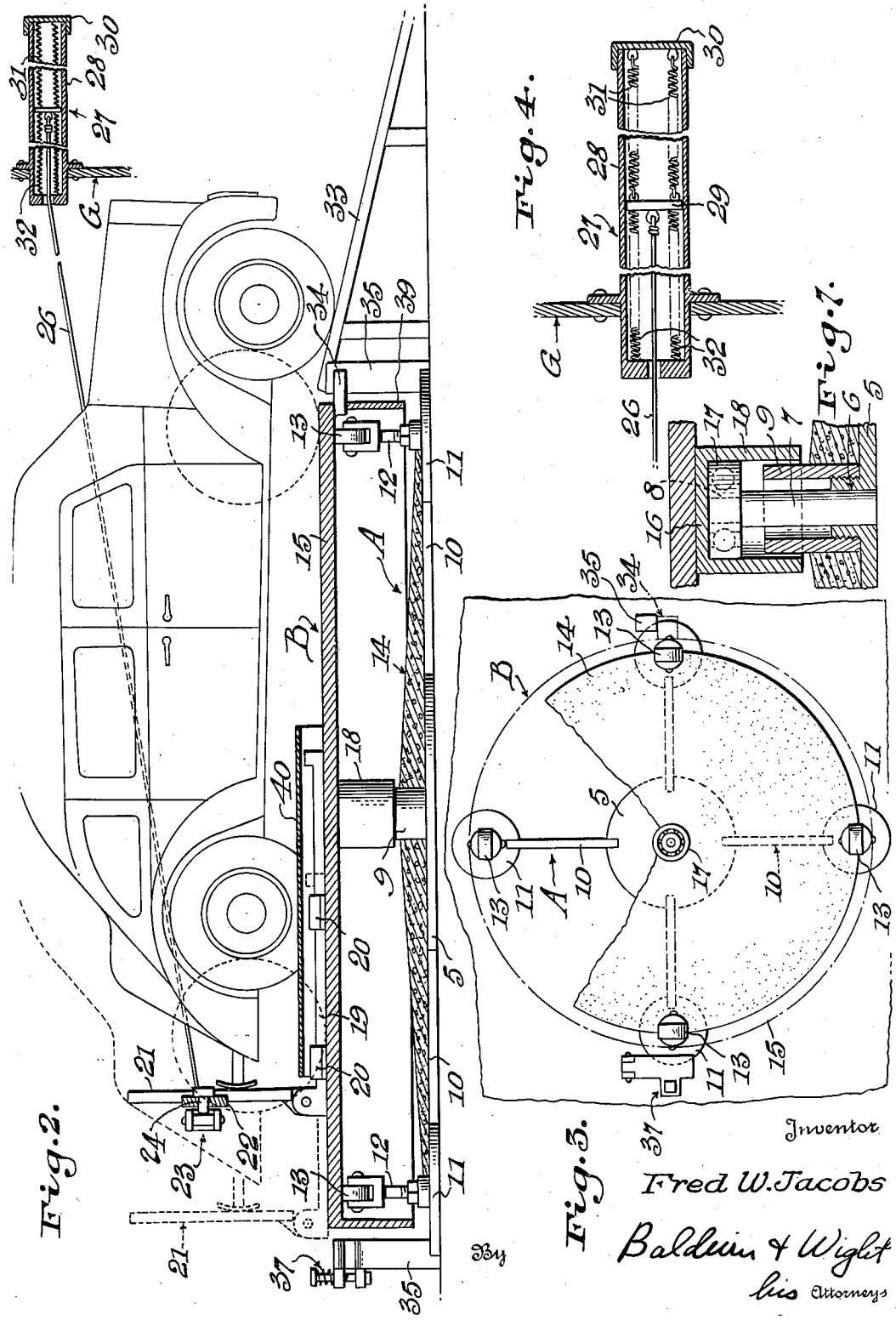
Inventor
Fred W. Jacobs
By Baldwin & Wight
his Attorneys Patented May 14, 1940

2,200,422

UNITED STATES PATENT OFFICE 2,200,422

VEHICLE POSITION ALTERING DEVICE

Fred W. Jacobs, Louisville, Ky.

Application October 28, 1939, Serial No. 301,814

8 Claims. (Cl. 104—40)

This invention relates to certain new and useful improvements in apparatus for altering the position of a vehicle and seeks to provide novel means for automatically altering the position of an automobile as it leaves a garage or the like and approaches a driveway leading therefrom to a highway or street.

Many private garages are located to one side of and adjacent the rear of the associated house with a long narrow driveway passing along the side of the house and extending from the garage to the street upon which the house faces. Normally when a driver wishes to put his car into his garage, he merely drives the car forwardly over the driveway and into the garage. When the driver wishes to again use his car, he must back the car out of the garage, along the narrow driveway, and into the street. This procedure is at once difficult and dangerous. It is difficult for a driver to back a car over any appreciable distance, and particularly so over a narrow road surface such as a garage driveway, without going off the road at least once, to the detriment of the car and the lawn adjacent the driveway. It is a very dangerous operation to back a car into a street or highway since the visibility of the driver is very limited and he cannot see oncoming vehicles or children playing immediately in back of the car or close to each side thereof.

Through the use of this invention I avoid the difficulties and dangers enumerated above by providing a position reversing device mounted in the driveway and cooperatively associated with the garage, so that when a driver backs a car from the garage, the car will ride onto and be supported by the device and will be automatically turned 180 degrees to thereby face forwardly and permit the driver to leave the driveway and enter the street or highway in a safe manner.

Therefore, an object of the invention is to provide a position reversing device for automotive vehicles which is disposed in cooperative relationship to a garage and which includes an element adapted to receive and support an automobile and which is automatically moved 180 degrees about a vertical axis through the medium of spring power when the automobile is disposed thereon, the spring power means being energized during movement of the automobile onto the movable supporting element.

Another object of the invention is to provide a device of the character stated in which the entire assembly is supported above the ground level, thereby eliminating the necessity for excavating any mechanism-receiving wells.

Another object of the invention is to provide a device of the character stated in which the position reversing element is mounted on anti-friction bearing means so disposed and protected as to be substantially weather tight.

Another object of the invention is to provide a device of the character stated which includes an anchor frame having a central plate and a plurality of radially extending arms secured to said plate, a movable car position reversing platform journaled on said plate, a plurality of adjustable-standard-mounted rollers carried by the ends of said arms and disposed beneath said platform for supporting the edge portions thereof, and spring powered means for turning said platform through 180 degrees, or another predetermined degree of angular movement sufficient to suitably direct the front end of the car, said spring means being energized during movement of a car onto the platform and effective for platform moving purposes as soon as the car is entirely supported by said platform.

Another object of the invention is to provide a device of the character stated which is economical to manufacture and install, as there are no motors and no need for excavating in the installation; which is simple in design, and rugged in construction.

With these and other objects in view which will more fully appear, the nature of the invention will be more clearly understood by following the description, the appended claims, and the several views illustrated in the accompanying drawings.

In the drawings:

Figure 1 is a somewhat diagrammatic perspective view illustrating the invention.

Figure 2 is a central longitudinal vertical section illustrating a car moving onto the platform and storing energy in the spring unit.

Figure 3 is a somewhat diagrammatic plan view of the skeleton base frame, a portion of the anchoring plastic being broken away and the position of the movable platform being indicated in dot and dash lines.

Figure 4 is an enlarged central longitudinal section of the spring unit.

Figure 5 is a detail perspective view illustrating the slide standards in the collapsed position.

Figure 6 is an enlarged detail elevation of the spring stop.

Figure 7 is an enlarged central vertical section illustrating the main bearing for the platform.

Referring to the drawings in detail, the invention as illustrated is embodied in a position reversing device for automotive vehicles and includes an anchor frame or stand generally designated A, and a movable table or platform element generally designated B mounted thereon.

The anchor frame A includes a relatively large central plate 5 having a boss 6 formed thereon. A centrally disposed standard 7 is threadably engaged or otherwise secured in the boss 6, and is provided at its upper end with a spindle or stud portion 8. The external surface of the boss 6 is threaded to engage an upstanding sleeve 9 which forms part of a weather seal.

The plate 5 is provided with a plurality of radially extending arms 10 rigidly secured thereto and provided at their outer ends with small ground-engaging plates 11. Each plate 11 carries a vertically adjustable standard 12 having a pair of rollers 13 journaled at the upper end thereof.

The above described frame assembly comprises the anchor frame of the invention and the supporting stand for the platform or table element. In order to maintain the frame A in secure ground-engaging position when the invention is in operation without the necessity of digging wells or the like to receive the structure, the spaces between the center plate 5, the arms 10 and parts of the plates 11 are covered over with concrete, asphalt, or other hard setting plastic as indicated at 14. The plastic filler 14 is shaped to a general coniform configuration to facilitate water drainage in bad weather. It will be observed that the central portion of the filler mass 14 surrounds the sleeve 9 but extends upwardly for only a small part of the sleeve height. Thus the weight of the frame A, augmented by the filler mass 14, constitutes the sole securing means for maintaining the device in fixed position relative to the ground.

The platform or table element B comprises a relatively large vehicle supporting disk 15 having a centrally disposed inverted cup bearing 16 mounted thereon and surrounding and resting upon an anti-friction bearing 17. The anti-friction bearing 17 is fitted over the stud portion 8 of the standard 7 and rotatably supports the table element 15. The member 16 is provided with a depending skirt portion 18 overlapping the upstanding sleeve 9 on the frame A, and terminating just above the filler mass 14. The upstanding sleeve 9 and the depending skirt portion 18 together form a weather seal to protect the bearing assembly from the detrimental effects of inclement weather.

The platform is provided with a pair of spaced parallel slides 19 mounted in slideways 20 secured to the table 15 and disposed with their longitudinal axes in the general direction of travel of a car and symmetrically disposed with relation to the table axis. A pair of normally upstanding standards 21 are hingedly connected to the respective slides 19 and are rigidly connected together as at 22. It should be noted that the standards 21 are connected by knee joints so that they can be folded over the slides 19 but cannot be folded out flat away from the slides.

A lever arm 23 has one end pivotally connected as at 24 to the standard connecting means 22, and its other end projecting laterally beyond the standard. The arm 23 is prevented from dropping below a normal horizontal plane by an open ended bracket 25.

The free end of the arm 23 is attached to one end of a cable 26 which has its other end secured to a spring power means generally designated 27 secured to the inner face of the front wall of a garage G.

The spring means 27 is used to apply power to the table 15 to rotate it through the desired arc (180 degrees as herein disclosed) after a car has been driven thereon, and consists of a casing 28 having a disk 29 slidably mounted therein. The free end of the casing 29 is closed by a cap or closure member 30. A plurality of tension springs 31 have their ends respectively connected to the closure 30 and the disk 29, and a plurality of compression springs 32 are interposed between the disk and the front limit of the casing 28. The end of the cable 26 which is operatively connected to the spring means 27 is secured to the middle of the disk 29.

Since the level of the upper face of the table element 15 is above the general plane of the ground, it is desirable to provide ramps 33 leading thereto and therefrom in order to facilitate the use of the device.

In operation, the driver backs his car from the garage up one ramp equipment 33 and onto the table 15 in a continuous and uniform motion until the car is entirely on the table. As the rear end of the car moves onto the table its rear bumper will engage the standards 21 and the connector 22. Continued motion of the car will then effect a rearward movement of the standards 21, the slides 19, and the lever arm 23 which is attached to the cable 26, thereby moving the cable 26 and the disk 29 in a direction for stretching the tension springs 31 and compressing the compression springs 32 to thereby store energy in the spring means 27. By the time that the entire car is upon the table 15, the stored energy in the spring unit 27 will have overcome the static inertia of the entire mass, with respect to rotation, and will effect a partial rotation of the table 15 and the car standing thereon.

The initial impulse imparted by the springs is sufficient to effect movement of the table 15 through a considerable angle. However, the amount of movement imparted to the table is limited in the present example of embodiment to 180 degrees by the engagement of a stop lug 34 mounted on the table with stop standards 35 secured to the frame A. One or both standards 35 may be provided with a laterally extending resilient bifurcated arm portion 36 adapted to receive the lug 34, the lug passing between the bifurcations of the arm portion 36 which yieldably apply pressure thereto and thereby function as a brake to stop rotation of the table smoothly and positively. Means 37 may be provided to vary or adjust the resilient and braking action of the jaws of the arm portion 36.

After a car has had its position reversed through use of the device herein disclosed, the table is manually returned to its original position through the use of a collapsible handle or capstan bar 38.

A dependably mounted skirt 39 may be secured to the periphery of the table 15 to mask the structure thereunder and to aid in making the structure weatherproof.

The slide assembly may be protected against weather by a plate 40 overlying the slideways 20 and having edge portions secured to the platform 15, as shown in Fig. 1 of the drawings.

Thus it will be seen that the invention herein disclosed provides a novel position reversing device for automotive vehicles or the like which includes a movable platform element for supporting such cars, and which is automatically moved 180 degrees by spring means effective as soon as the entire car is on the table and in which the energy is stored during movement of the car onto the table; which is simple in design, rugged in construction, and economical to manufacture.

It is of course to be understood that the details of structure and arrangement of parts may be variously changed and modified without departing from the spirit and scope of my invention.

I claim:

1. A position altering device for vehicles including a supporting frame, a vehicle-supporting disk journaled on said frame for movement about a vertical axis, energy storing and power applying means fixedly mounted without the confines of said disk, means on said disk and connected with said energy storing and power applying means and disposed in position for being engaged and moved by a vehicle as it moves onto the disk whereby movement of the vehicle onto the disk will serve to store energy in the energy storing and power applying means effective when the vehicle is on the disk to move the disk and the vehicle thereon, and means for limiting movement of the disk.

2. A position altering device for vehicles including a supporting frame, a vehicle-supporting disk journaled on said frame for movement about a vertical axis, an abutment on the disk and disposed for being engaged and moved by a vehicle driving onto the disk, and spring means connected with said abutment and with a fixed support without the confines of the disk adapted for storing energy during movement of a vehicle onto said disk effective for moving said disk when said vehicle is supported on said disk.

3. A position altering device for vehicles including a supporting frame, a vehicle-supporting disk journaled on said frame for movement about a vertical axis, an abutment on the disk and disposed for being engaged and moved by a vehicle driving onto the disk, spring means connected with said abutment and with a fixed support without the confines of the disk adapted for storing energy during movement of a vehicle onto said disk effective for moving said disk when said vehicle is supported on said disk, and means for stopping movement of said disk after a predetermined degree of angular movement thereof.

4. An apparatus as defined in claim 2 in which said spring means includes a plurality of tension and compression springs which are respectively and simultaneously tensioned and compressed as said abutment is displaced by a vehicle moving onto the disk.

5. An apparatus as defined in claim 1 in which said movement limiting means includes a stop lug secured to said disk and a standard fixedly mounted in position for being engaged by said lug and having laterally disposed yieldable clamping jaws adapted to receive and clamp said stop lug to thereby bring the disk to a cushioned stop.

6. An apparatus as defined in claim 2 in which said disk includes a slideway and in which said abutment comprises a slide mounted in said slideway, an upstanding vehicle-engaging standard mounted on said slide, and a lever arm having one end secured to said standard and its other end disposed off center with respect to said element and connected to said spring means.

7. An apparatus as defined in claim 2 in which said disk includes a slideway and in which said abutment comprises a slide mounted in said slideway, a normally upstanding vehicle-engaging standard mounted on said slide by a knee-joint, and a lever arm having one end pivotally secured to said standard and its other end disposed off center with respect to said element and cable connected to said spring means whereby said standard may be folded over said slide and said lever arm may be positioned to lie in said direction of vehicle travel to thereby permit a vehicle to traverse the device without engaging said vehicle-engaging means when traveling in a direction not requiring a change of directive position.

8. An apparatus as defined in claim 1 in which is provided means for manually returning the disk to its initial position and including a collapsible handle mounted on said disk.

FRED W. JACOBS.